United States Patent [19]
Godin

[11] 3,788,484
[45] Jan. 29, 1974

[54] INLINE FLUID FILTER
[75] Inventor: Thomas J. Godin, West Hollywood, Fla.
[73] Assignee: Coulter Electronics Inc., Hialeah, Fla.
[22] Filed: Aug. 23, 1971
[21] Appl. No.: 173,846

[52] U.S. Cl. .............................. 210/447, 210/470
[51] Int. Cl. ............................................. B01d 27/08
[58] Field of Search ... 210/447, 445, 446, 454, 455, 210/464, 470; 55/502, 481

[56] References Cited
UNITED STATES PATENTS
| 586,724 | 7/1897 | Edmonds | 210/447 |
| 3,615,257 | 10/1971 | Frost et al. | 210/447 |
| 2,879,207 | 3/1959 | Poltras | 210/446 |
| 1,857,606 | 5/1932 | Rendelman | 210/447 X |
| 3,471,019 | 10/1969 | Trasen et al. | 210/445 |
| 3,622,008 | 11/1971 | Mucci et al. | 210/445 |
| 1,231,356 | 6/1917 | Houge | 210/447 X |
| 3,295,684 | 1/1967 | Webb | 210/446 X |

Primary Examiner—Samih N. Zaharna
Assistant Examiner—T. A. Granger
Attorney, Agent, or Firm—Irving Silverman et al.

[57] ABSTRACT

A fluid filter to be used for inline installation or in systems which are not to be disturbed when it is desired to clean or replace the filter member. An enclosed body has a lateral slot and the filter element is carried by a removable carrier member which is engaged in the slot into filtering position. Seals are provided to prevent leakage when the carrier member is in operative position.

6 Claims, 3 Drawing Figures

PATENTED JAN 29 1974    3,788,484

INLINE FLUID FILTER

BACKGROUND OF THE INVENTION

In many fluid systems it is required that the fluid be filtered through a filter element in order to remove impurities or particles. Periodically the filter element must be cleaned and the construction of known apparatus holding the filter element is to provide a body which must be disassembled in order to gain access to the filter element. This is inconvenient and time consuming and furthermore may present substantial problems in systems which cannot or should not be disassembled for any of a variety of reasons.

The invention provides for the filter element to be removable so that it may be replaced or cleaned without disassembling the holder but which establishes a sealed connection within the holder or body of the filtering device so that there is no loss of fluid during use.

SUMMARY OF THE INVENTION

The invention comprises a hollow body adapted to be connected to a fluid line and having a lateral slot enabling the insertion and removal of a filter element holder with respect to the body without disassembling the body. When in position within the body the filter element holder is in fluid sealed condition. During removal collected debris is carried out of the body with the filter element holder.

DESCRIPTION OF THE PREFERRED EMBODIMENT

Figure 2:
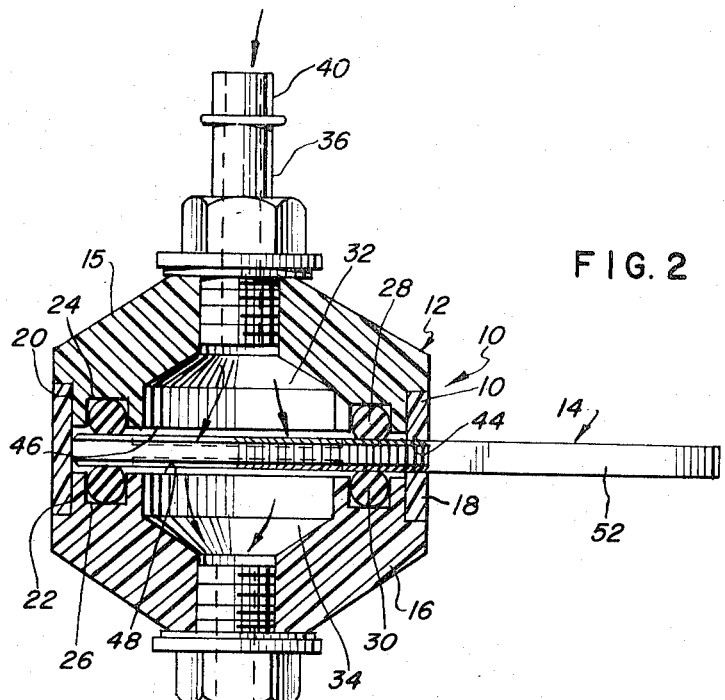
FIG. 2 is a median sectional view of the assembled filter device.
Figure 3:
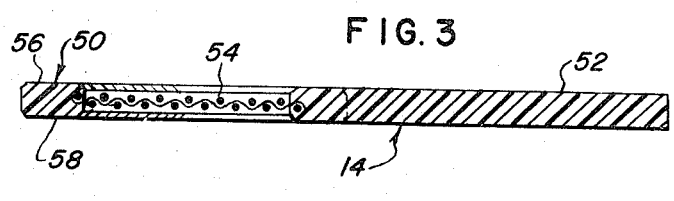
FIG. 3 is a median sectional view of the filter element carrier.
Figure 1:
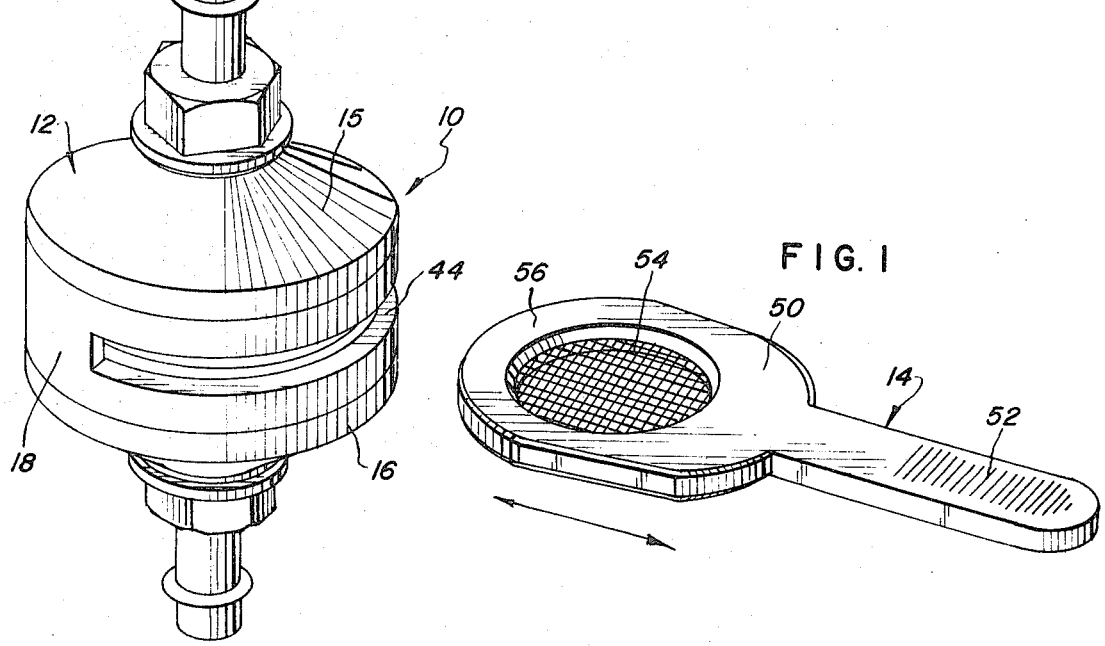
FIG. 1 is an exploded perspective view of a filter constructed in accordance with the invention and showing the filter element carrier removed from the filter body.

The filter device of the invention is designated by the reference character 10 and the same is composed of a generally cylindrical body 12 and a removable filter element carrier 14.

The body 12 in the particular embodiment shown comprises upper and lower generally conical shaped headers 15 and 16 held in assembly by means of a cylindrical sleeve 18 that is set into suitable cooperating annular recesses 20 and 22 formed in the respective exterior surfaces of the headers 15 and 16.

The headers 15 and 16 as well as the cylindrical sleeve 18 may all be formed of any suitable material such as metal or plastic and be suitably assembled. Preferably they are molded from synthetic resins fully compatable with the fluid to be passed through the device 10 and are permanently cemented together.

The sleeve 18 serves to connect the header 15 and 16 together and to establish the axial spacing of the headers 15 and 16. Each header 15 and 16 has an annular groove as shown at 24 and 26, respectively, with an elastomeric 0-ring 28, and 30 disposed in the respective groove 24, 26. Also, each of the headers 15 and 16 has a generally hollow interior to provide the chambers 32 and 34 respectively.

Any suitable fitting such as shown at 36 and 38 may be mounted to the respective headers 15 and 16 to enable insertion of the filter device 10 into a fluid line. For example a nipple or spigot 40 is connected to the fitting 36 and to a fluid intake line (not shown) and a nipple or spigot 42 is connected to the fitting 38 and to a fluid outlet line (not shown). With this arrangement fluid passes through the spigot 40 and the fitting 36 into the chamber 32, through the filter element (to be described) mounted on the carrier 14, into the chamber 34, and then through the fitting 38 and out the spigot 42 to continue to other apparatus. Although shown as threaded into the respective headers 15 and 16, the fittings 36 and 38 may be secured in any other suitable manner. For example, the body 12 may be formed of metal and the fittings 36 and 38 soldered in place.

The central sleeve 18 has a lateral slot 44 which opens along a substantial portion of the periphery of the sleeve 18 into the interior of the body 12. The headers 15 and 16 are sufficiently spaced apart so that their juxtaposed axial end faces lie in planes indicated at 46 and 48 spaced apart a greater distance than the distance between the facing 0-rings 28 and 30. The slot 44 is aligned with the space between the planes 46 and 48.

The filter element carrier 14 is in the configuration of a paddle having a head 50 and a handle 52. It is preferably molded of the same material as that of the body 12. A filter element 54 which may be a screen of some suitable mesh and material is secured in the head 50. The filter element 54 is surrounded by generally annular lands 56 and 58 on the upper and lower surfaces of the head 50 with the lands 56 and 58 being spaced from the plane of the filter element 54. The thickness of the head 50 is such that it is slightly larger than the space between the facing 0-rings 28 and 30 and yet less than the distance between the planes 46 and 48 when the body 12 is assembled. The dimensions of the lands 56 and 58 are such that when the filter element carrier 14 is in position as shown in FIG. 2 the 0-rings 28 and 30 will tightly engage and seat against the respective lands 56 and 58. This will seal the head 50 in proper aligned position with respect to the flow of fluid within the filter body 12.

It will be seen that the filter element carrier 14 is readily removable and insertable into the body 12 by way of the slot 44 and that when it is inserted it will be sealed against fluid leakage.

Any debris or particulate matter which collects on the filter element 54 may build up substantially due to the greater thickness of the head 50 so that when the filter element carrier 14 is removed the particulate matter will not be scraped off.

The filter element 54 is preferably molded to the carrier 14 at the time that the carrier itself is fabricated so that it is secured in position firmly. Such filter element 54 may be a plastic fabric or woven metal mesh screen having suitable characteristics. Diffferent size mesh may readily be substituted for different purposes or uses of the filter.

Although primarily intended for use in filtering fluids encountered in particle technology, where the diameter of the body 12 is somewhat less than an inch, the principles of the invention are applicable to larger filter devices. Accordingly considerable variation is capable of being made to the filter device 10 without departing from the spirit or scope of the invention as defined in the appended claims. For example, each of the headers 15 and 16 can be formed with an annular shoulder segment in place of the groove 20 or 22. The headers 15 and 16 are then secured together using a suitable adhesive without the sleeve 18 and with the shoulder segments aligned and axially secured to each other and serving to space the planes 26 and 28 the desired distance apart in alignment with the lateral slot.

What it is desired to secure by Letters Patent of the United States is:

1. A fluid filter device comprising:

A   A hollow body with a filtering chamber therein;

B   means for connecting opposite ends of said body into a fluid line to enable fluid to pass through said filtering chamber;

C   a lateral slot in said body giving access to said filtering chamber from the exterior of said body;

D   a slidable carrying member for a filter element and with a central aperture therethrough and a filter element in fluid flow communication with said aperture;

E   said member being constructed to be inserted through said slot into said body whereby said filter element is arranged transversely of said filtering chamber to require fluid passing through said filtering chamber to pass through said filter element;

F   said member including a flat portion forming sealing means surrounding said aperture and cooperating with said body to seal said member against leakage of fluid from said body while said filter element is inserted within said slot;

G   groove means in said body contiguous to said lateral slot circumferentibly surrounding said filter chamber within said body;

H   resilient ring means positioned within said groove means and in tangential frictional contact with said flat portion of said member to secure said member in filtering position in said body, and I   handle means on said filter element carrying member.

2. The filter device as claimed in claim 1 wherein said lateral slot opens along a substantial portion of the periphery of said body and communicates with a generally annular space which extends into said body about said filtering chambers, said annular space being defined in part by laterally extending, oppositely facing, spaced apart planes, the distance between said planes being greater than the thickness of said filter element carrying member.

3. The filter device as claimed in claim 2 wherein said sealing means includes first and second elastomeric sealing members which are fixed respectively to oppositely facing sides of said annular space defined respectively by said planes, each of said sealing members having a portion thereof which extends about said filtering chamber and which projects from one of said planes toward the other of said planes, the distance between said facing projection portions, when said filter element carrying member is removed from said device, being less than the thickness of said filter element carrying member so that when said filter element carrying member is inserted into said annular space, the projection portions will fluid tightly engage and seat against opposite sides of said filter element carrier member and about said filter element in said filtering position.

4. The filter device as claimed in claim 1 wherein said body comprises first and second identical headers each having a chamber portion therein, each header having an annular planar surface with an annular groove therein, an elastomeric 0-ring disposed in each of said grooves, said headers being secured together with said chamber portions forming said chamber and with said planar surfaces spaced apart to form a generally annular space which is in alignment with said lateral slot opening onto the periphery of said body.

5. The filter device as claimed in claim 4 including a sleeve, said headers being secured together and spaced apart by said sleeve which encircles and is fixed to the facing ends of said headers, and said sleeve having said lateral slot therein.

6. The filter device as claimed in claim 4 wherein said planar surfaces are spaced apart a distance greater than the thickness of said filter element carrying member and the distance between said facing 0-rings being less than the thickness of said filter element carrying member befor said filter element carrying member is inserted into said annular space so that upon insertion thereof in said filtering position, said 0-rings will fluid tightly engage and seat against opposite sides of said filter element carrying member and about said filter element in said filter element carrying member.

* * * * *